United States Patent [19]

Furtah, Jr.

[11] 4,046,241

[45] Sept. 6, 1977

[54] OVER-RIDE MECHANISM FOR SCREW DRIVE ACTUATOR

[75] Inventor: Reginald D. Furtah, Jr., Livonia, Mich.

[73] Assignee: Essex Group, Inc., Fort Wayne, Ind.

[21] Appl. No.: 669,942

[22] Filed: Mar. 24, 1976

[51] Int. Cl.² .............................................. F16P 3/00
[52] U.S. Cl. .................................. 192/150; 74/59.15; 74/424.5 R; 64/28 R
[58] Field of Search .................... 74/412 TA, 527, 22, 74/23, 59.15, 424.8 R; 64/28 R; 192/56, 150

[56] References Cited

U.S. PATENT DOCUMENTS

| 1,607,628 | 11/1926 | Hume | 192/150 |
|---|---|---|---|
| 2,612,051 | 9/1952 | Felt | 74/527 |
| 3,161,240 | 12/1944 | Horowitz | 192/150 |
| 3,260,334 | 7/1966 | Johnson | 192/150 |
| 3,487,902 | 1/1970 | Persson et al. | 64/28 |
| 3,968,705 | 7/1976 | Amano et al. | 74/412.7 A |

*Primary Examiner*—Samuel Scott
*Assistant Examiner*—Wesley S. Ratliff, Jr.
*Attorney, Agent, or Firm*—Lawrence E. Freiburger; Robert D. Sommer

[57] ABSTRACT

A spring clip over-ride mechanism for screw drive actuators which convert rotary motion to linear motion. The screw drive actuator of the invention has a tubular rotatably driven member and a screw threaded rod axially located inside the tubular member. The tubular member has a plurality of apertures therein. The spring clip of the invention surrounds the tubular member and biases a ball occupying each aperture into engagement with the threads on the rod member such that under normal conditions the balls drivingly engage the threaded rod to convert the rotary motion of the tubular member into linear motion of the rod member. In the event the rod member jams, the spring clip overload mechanism of the invention allows the driving balls to move radially outwardly so as to disengage themselves from the rod threads. Thus, the spring clip of the invention allows the screw drive actuator to be manually moved as well as provides a yieldable overload mechanism which allows the tubular member to continue to rotate even if the rod member is jammed.

5 Claims, 3 Drawing Figures

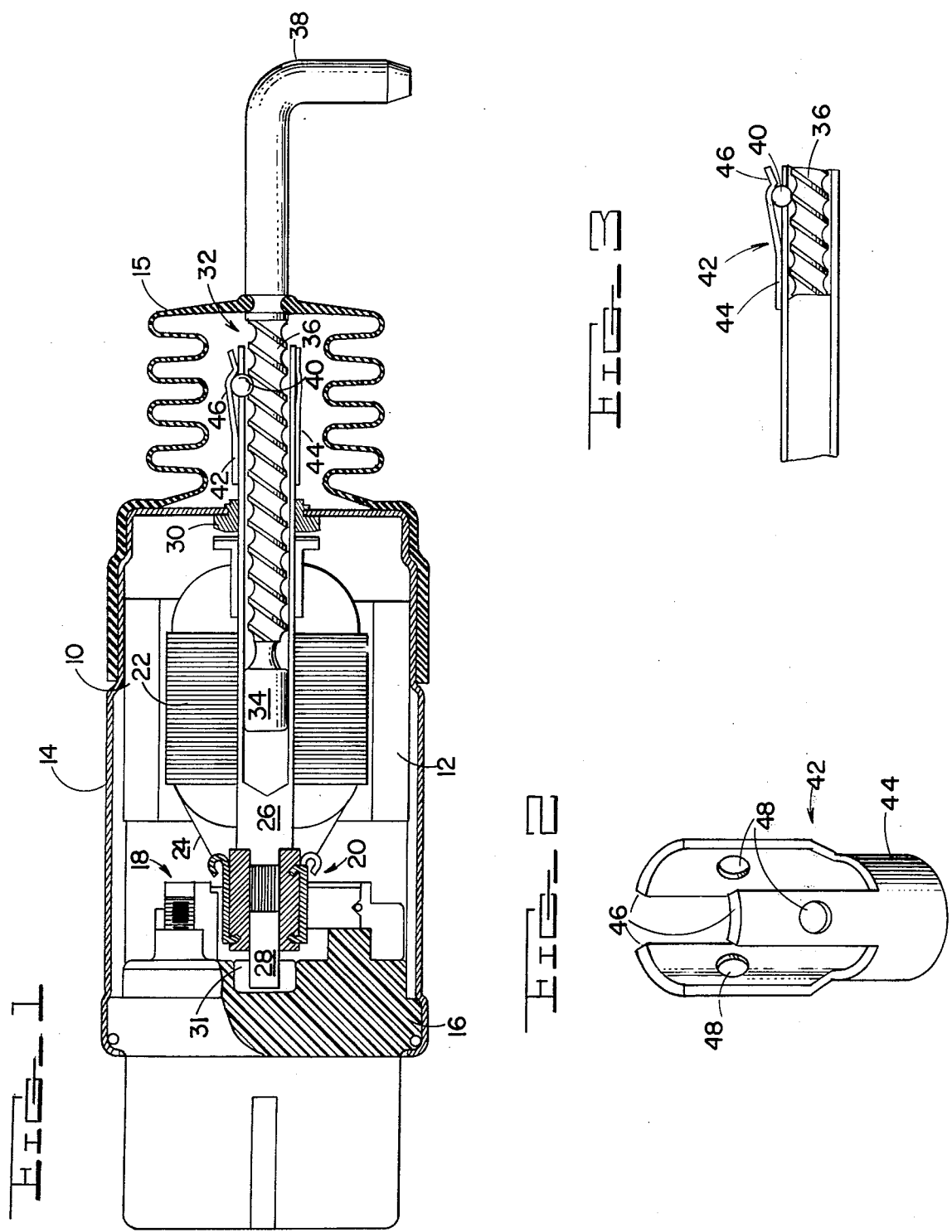

OVER-RIDE MECHANISM FOR SCREW DRIVE ACTUATOR

BACKGROUND OF THE INVENTION

Screw drive actuators are known in the prior art which convert rotary motion into linear motion. In one type of prior art screw drive actuator, a rotating nut member cooperates with a corresponding screw member to produce the desired linear movement. A plurality of longitudinally spaced separate grooves running around the inside of the nut member and a plurality of balls held in place by a retainer member interposed between the nut and screw members, cooperate with the screw threads to convert the rotary motion of the nut into linear motion of the screw member. While this prior art actuator has been satisfactory in many respects, it does not provide for an overload mechanism whereby the nut member continues to rotate even if the screw member jams nor does it permit manual movement of the threaded rod.

Another prior art screw drive actuator provides an assembly of three rollers spaced around and engaging a member which is to be longitudinally driven. The rollers have a garter type spring surrounding them so as to urge them radially inwardly against the longitudinally driven member. The roller assembly is rotated around the longitudinal member so as to produce the desired motion conversion. While this device does provide overload function in that the rollers are allowed to move radially outwardly, this device suffers from the drawback that it is relatively complicated and time consuming to assemble.

SUMMARY OF THE INVENTION

Accordingly, it is an object of the present invention to provide a simple reliable structure for a screw drive actuator which provides the desired conversion from rotary to linear movement as well as providing overload and over-ride functions.

An additional object of the present invention is to provide a simple easily assembled screw drive actuator mechanism.

Another object of the present invention is to provide a screw drive actuator having a motion conversion mechanism which does not jam should the screw member jam.

These objects as well as others which will become more apparent as the description of the invention proceeds are accomplished by attaching a spring clip member to a tubular rotatably driven member. The spring clip forms a biasing member for a plurality of balls which are urged into driving engagement with the threads of a screw member. In addition to forming a portion of the driving connection between the tubular member and the screw member, the spring clip of the invention provides an overload release. The clip has a plurality of fingers, each of which is associated with one ball member, and which are radially yieldable so as to allow the balls to disengage themselves from the screw threads in the event the screw member jams or is moved by manual means.

BRIEF DESCRIPTION OF THE PRESENT INVENTION

In the course of the detailed description of the invention, reference will be made to the drawings in which:

FIG. 1 is a partial cross sectional view of a screw drive actuator employing a spring clip overload mechanism in accordance with the present invention;

FIG. 2 is a perspective view of a spring clip of the invention; and

FIG. 3 is a partial elevational view showing the spring clip of the invention in the over-ride position.

DETAILED DESCRIPTION OF THE INVENTION

Referring now to FIG. 1, a screw drive actuator and spring clip override mechanism of the present invention are shown in combination with a source of rotary movement, namely an electric motor. It will be understood that other types of devices which produce rotary movement may be used as well. The electric motor shown includes a permanent magnet type stator which includes permanent magnets 10 and 12 which are mounted against the inside wall of a tubular casing 14. An insulative plug member 16 occupies one end of the tubular housing 14 and performs the functions of providing a mounting for electrical terminals (not shown). As is well known in the art, the electrice motor includes a brush assembly 18, and a commutator assembly 20. Also well known in the art, an armature assembly including a stack of laminations 22, armature windings 24 and a hollow armature shaft 26, is mounted for rotatable movement within the housing 14. An extension 28 of armature shaft 26 is suitably journaled in a plate member 31 attached to insulative plug 16. At the opposite end, armature shaft 26 is suitably journaled in a bushing 30 located in the end of housing 14. Preferably, the housing 14 has a boot 15 attached thereto which forms a gasket around an end portion 38 of a rod member 32 to prevent the entry of foreign material into the assembly.

The rod member 32 is located axially inside the hollow armature shaft 26. Rod member 32 includes a first end portion 34, a helically threaded central portion 36 and another end portion 38 which is adapted to actuate the desired device. The hollow, tubular armature shaft 26 extends axially from the end of housing 14 and has a plurality of apertures therein near the end which each receive a ball 40. The balls 40 are held in place in the apertures in armature shaft 26 by a resilient spring clip 42 which is shown in more detail in FIG. 2. Preferably, the resilient spring clip 42 has a split sleeve portion 44 which is adapted to surround hollow armature shaft 26 in such a manner that it is frictionally held in place. Spring clip member 42 also has a plurality of fingers 46 extending from the sleeve portion 44. Each finger 46 is adapted to exert radial inward pressure on one of balls 40 so as to urge it against the threads of rod member 32. Each finger 46 preferably has means thereon for insuring that the finger does not slip off of the ball 40 in the form of apertures 48 which are smaller than the diameter of ball 40.

The operation of the device should now be clear to those skilled in the art, but for sake of clarity the operation of the device will be briefly described. Driving balls 40 are held against threaded portion 36 by finger members 46 and as armature shaft 26 rotates the rotational movement is converted into linear movement by the cooperation between balls 40 and the threads on threaded rod member 32. It will be appreciated that if rod member should jam for any reason, armature shaft 26 will continue to rotate and spring clip 42 will allow balls 40 to disengage themselves from the threads as shown in FIG. 3. Further, if the device with which the screw driver actuator is used is manually over-ridden such by moving the rod, the spring clip arrangement will yield and allow the rod to be moved.

Of course, modifications will occur to those skilled in the art. In one modification which is contemplated, the spring clip may be attached to the housing as opposed to the motor shaft. With such a modification, it is necessary to make the spring clip almost completely tubular and provide grooves around the inside thereof to provide a path for the balls. It will be noticed that the preferred device has nothing to prevent rod member 32 from rotating. This is because the nature of the actuated device prevents the rod 32 from rotating. In all situations this might not be the case and, therefore, it might be necessary to modify the disclosed construction so as to provide some means to prevent rotation of the rod member.

It is intended that the claims define the invention as broadly as possible.

What is claimed is:

1. A mechanism for converting rotary motion into linear motion, comprising:
    a housing;
    a tubular member having a plurality of spaced apart apertures therein, said tubular member being mounted for rotatable movement in said housing;
    a helically threaded rod member extending axially into said tubular member;
    means occupying said apertures and engaging the threads on said helically threaded rod member linearly driving said rod member when said tubular member is rotated; and
    a unitary spring clip member attached to said tubular member, said spring clip member normally biasing said driving means into engagement with the threads on said rod member, said spring clip member further being yieldable so as to allow said driving means to disengage from the threads in the event said rod member jams or is over-ridden.

2. The mechanism as claimed in claim 1 wherein said unitary spring clip member comprises:
    a sleeve portion adapted to substantially surround and frictionally engage said tubular member; and
    a resilient finger extending from said sleeve portion, said finger normally urging said driving means into engagement with the threads on said rod member but allowing said driving means to disengage from said threads in the event said rod member jams or is overridden.

3. A combination driving and override mechanism for a screw drive actuator, comprising:
    a tubular member adapted for rotatable movement about an axis formed by its bore, said tubular member having an aperture therein;
    a helically threaded rod member situated axially in said tubular member;
    a driving ball situated in said aperture; and
    a spring clip member attached to said tubular member, said spring member including yieldable means thereon for normally biasing said ball into engagement with the threads on said rod member, said yieldable means further being adapted to allow said ball to disengage from said threads.

4. The combination driving and override mechanism as claimed in claim 3, wherein said spring clip member includes a tubular portion attached to the outside of said tubular member, a resilient finger extending from said tubular portion and normally urging said ball into engagement with said threads but allowing said ball to move radially outwardly if said rod member jams or is manually moved.

5. In combination, a screw drive actuator for producing linear motion, comprising:
    a housing;
    means for producing rotary movement mounted in said housing;
    a tubular member mounted in said housing and connected to said means for producing rotary movement;
    a helically threaded rod member situated axially in said tubular member;
    a driving ball member situated in said aperture; and
    a spring clip member attached to said tubular member, said spring clip member including yieldable means thereon for normally biasing said ball into engagement with the threads on said rod member, said yieldable means further being adapted to allow said ball to disengage from said threads.

* * * * *